Aug. 8, 1944.   H. M. BRAUCHER   2,355,051
BULGED CAN DETECTOR
Filed April 5, 1943   5 Sheets-Sheet 4
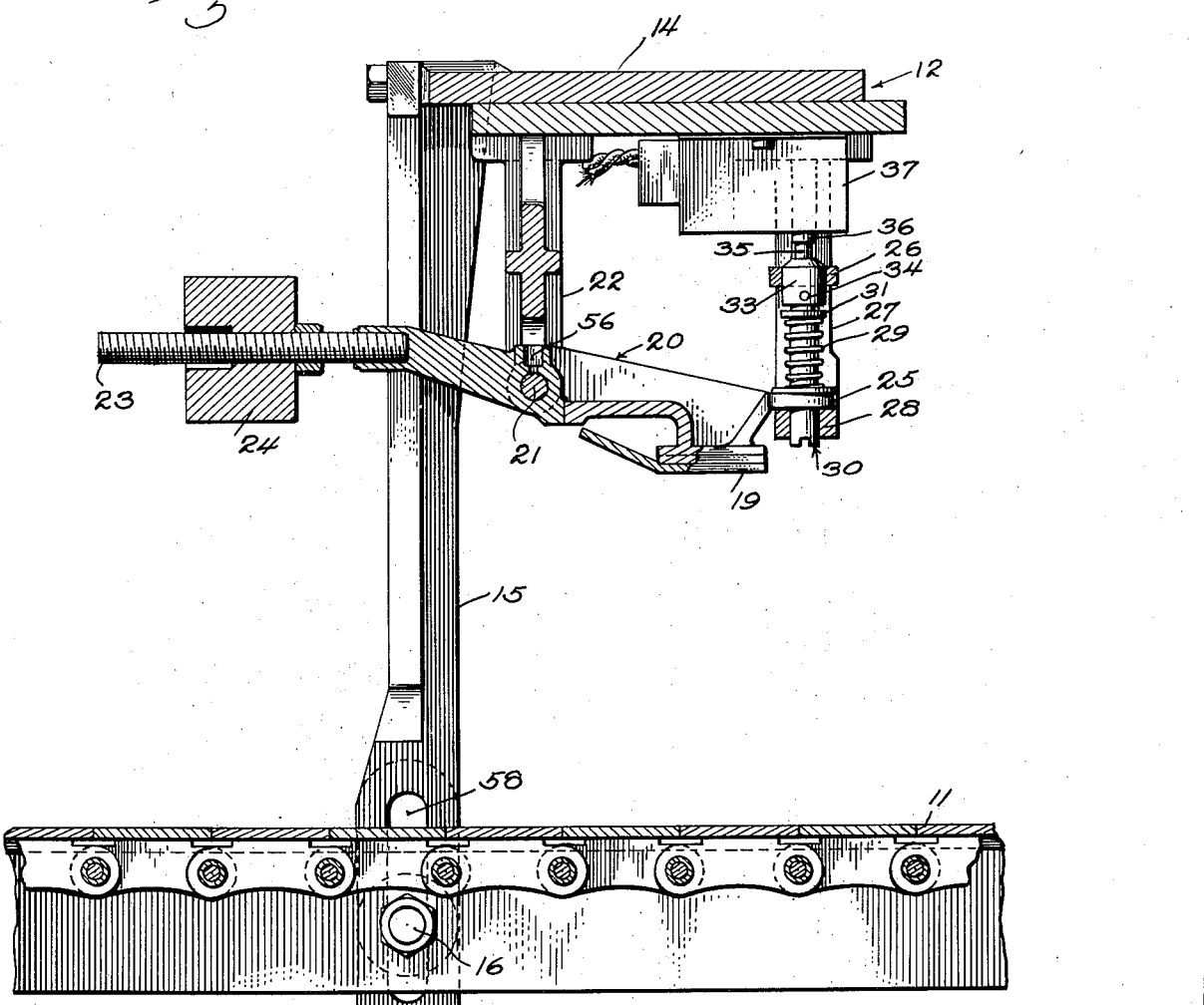
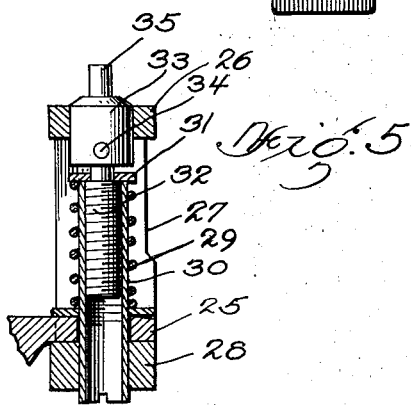
INVENTOR.
Harvey M. Braucher
BY
Rob't Williams, Jr.
ATTORNEY Aug. 8, 1944.   H. M. BRAUCHER   2,355,051
BULGED CAN DETECTOR
Filed April 5, 1943   5 Sheets-Sheet 5

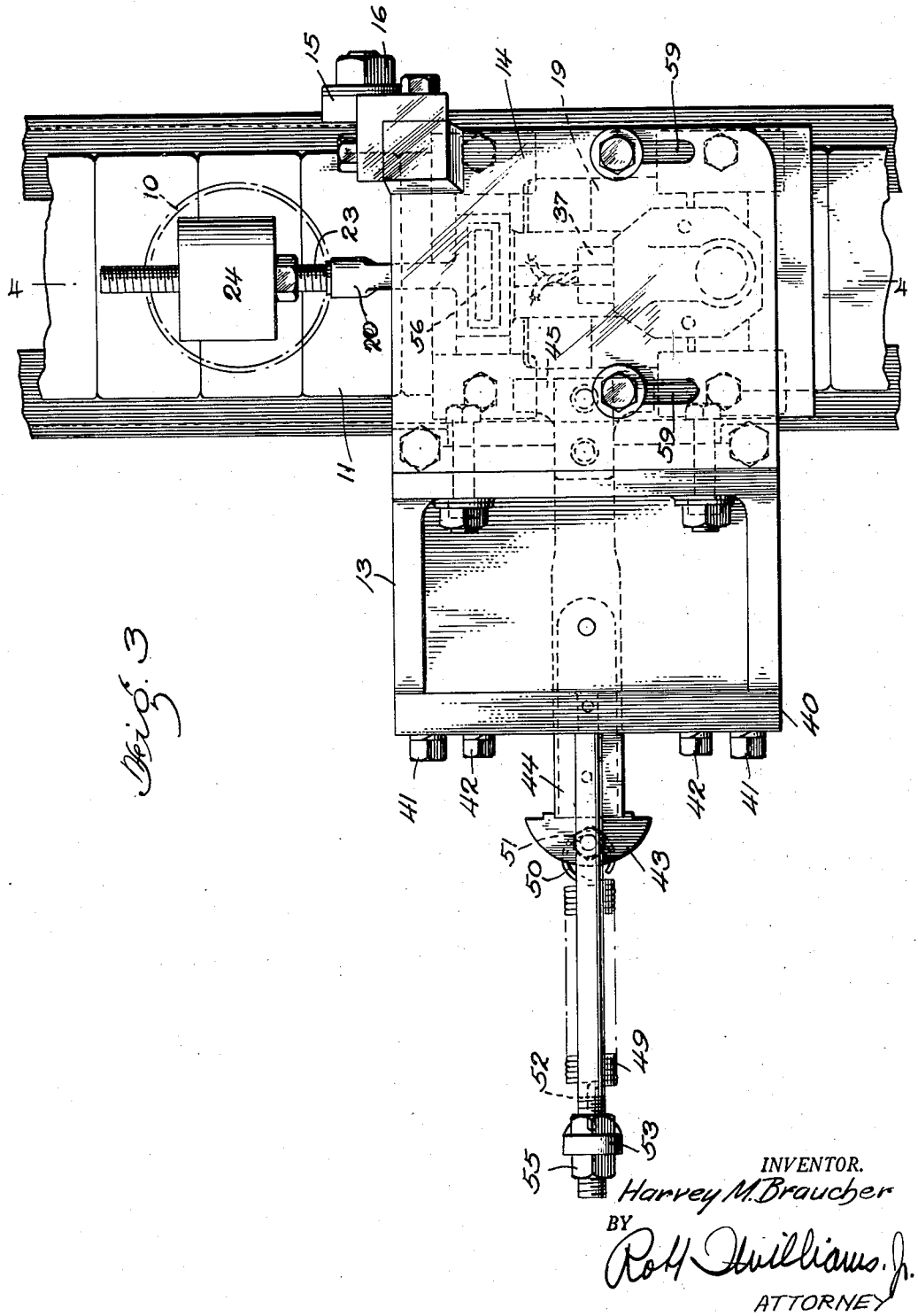

INVENTOR.
Harvey M. Braucher
BY
Roh Williams J.
ATTORNEY

UNITED STATES PATENT OFFICE 2,355,051

BULGED CAN DETECTOR

Harvey M. Braucher, Baltimore, Md.

Application April 5, 1943, Serial No. 481,888

4 Claims. (Cl. 209—88)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to a container or can tester and has particular reference to a tester which includes devices for automatically measuring the height of the container or can as it passes on a conveyor belt and eliminating such cans that are found imperfect.

The invention contemplates a can tester which is adapted to be interposed over a conveyor line of canned products and which will, upon the discovery of an imperfect can eliminate such can from the conveyor.

Different varieties of food products are packed, stored or canned in containers made from tin plate. Fruits, vegetables, berries, beverages, fish and meats are packed in such containers because shipping and transportation costs are more reasonable.

While the tin can is acceptable for preserving foods, it is not a perfect container and many serious spells of sickness are caused by improperly packed cans and cans that have leaked after packing.

Since cans do fail, and such failure would prove disasterous when large numbers are served at the same time, army camps in particular must guard against such a possibility.

To detect defective cans of food requires a testing device that is quick and accurate. Therefore, one of the objects of this invention is to provide means for testing the height of the cans that have bulged due to food spoilage and the manner in which this is done is perhaps one of the quickest and most accurate ways of detecting bad foods within the can, because when food products spoil, gas will form within the can. The gas thus produced exerts considerable pressure on the inside of the can causing the flat ends of the can to bulge outwardly, thereby increasing the height of the can.

This invention, by automatically measuring the height of the can as it passes on the conveyor belt, can easily detect any slight increase of height and upon such detection reject the can and thus prevent a can in which the food has spoiled from being packed and distributed to market.

It is a further purpose of this invention, therefore, to provide a balance lever mechanism wherein the lever, if lifted the slighted degree, will make an electrical contact and thereby close a circuit connected to a solenoid having a pusher thereon. The closing of the circuit causes the solenoid plunger to force the pusher against the defective can and eject it from the conveyor belt. This action is fast and will not prevent the belt from running continuously and the cans may be lined up on the conveyor as close as their peripheries will permit.

Other objects and advantages of the invention will appear as it is better understood from the description of the drawings as it proceeds, and it is not to be understood that the invention is to be limited to the exact details shown and described, but will include such obvious modifications and changes as will appear to a person well versed in the art or such details of variation that will fall within the scope of the appended claims.

It is thought that the machine embodying the invention will be more clearly understood by referring to the accompanying drawings wherein:

Fig. 3 is a top plan view.

Fig. 4 is a longitudinal sectional view on line 4—4 of Fig. 3.

Fig. 5 is an enlarged detailed section of the sleeve and plunger assembly shown in Fig. 4.

Figures 6, 7:
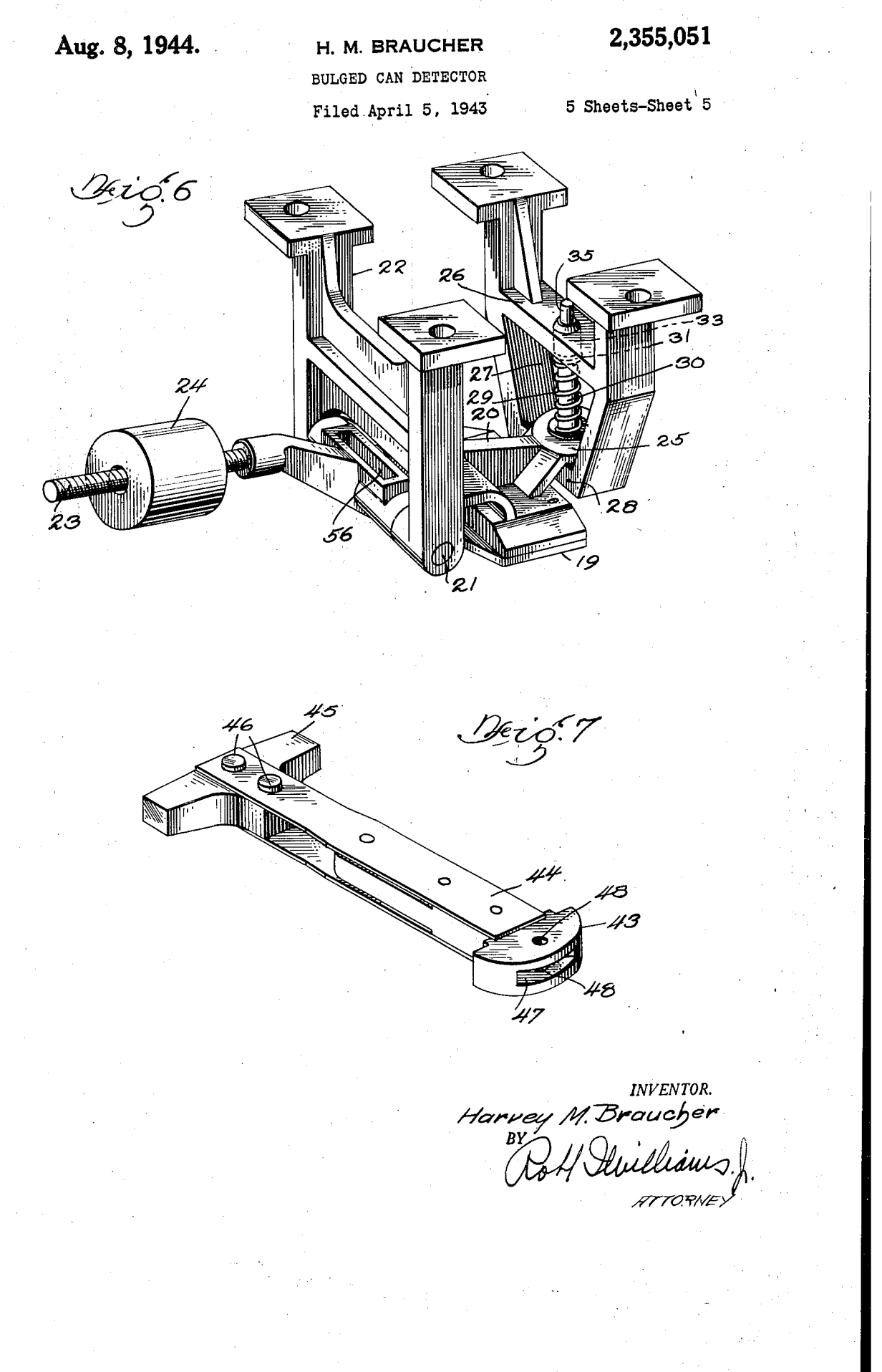

Fig. 6 is an enlarged perspective view of the balance arm mechanism; and,

Fig. 7 is an enlarged perspective view of the solenoid plunger and pusher.

Figure 1:
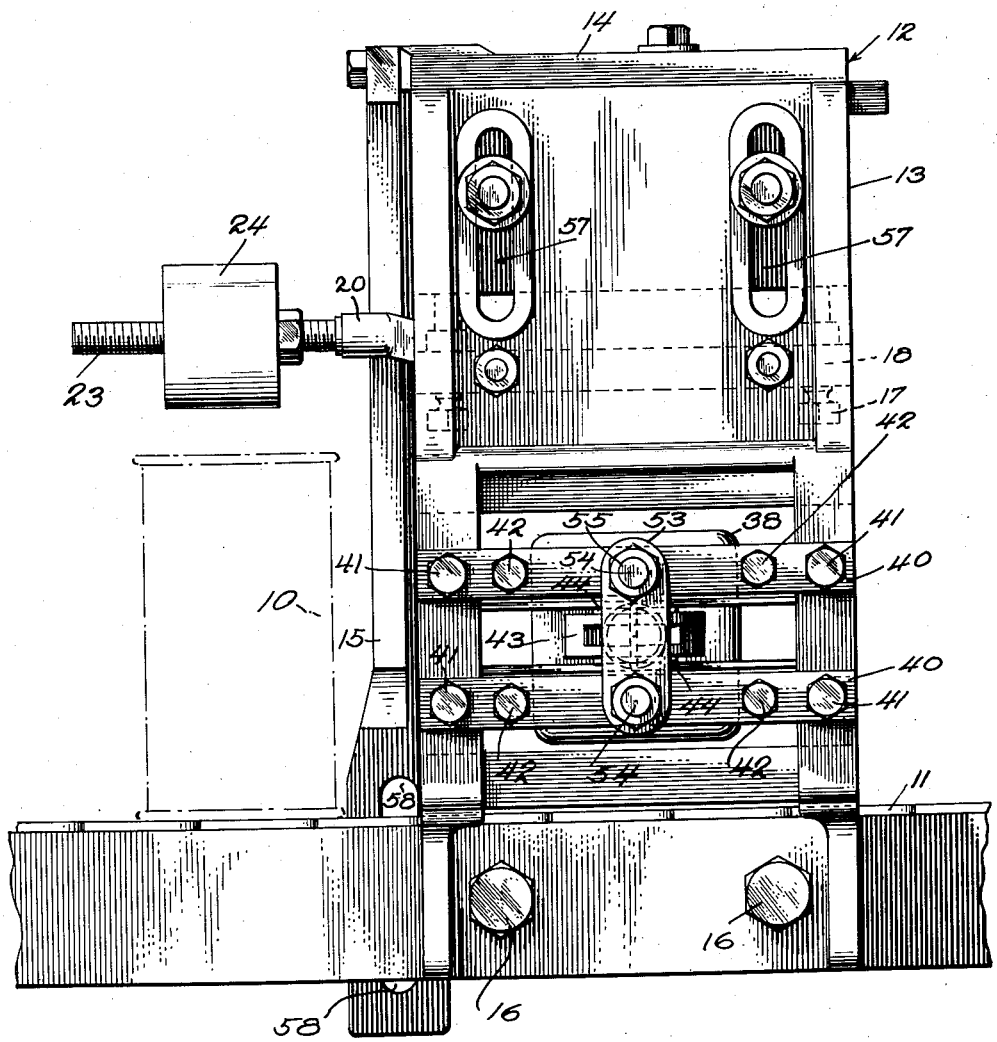
Fig. 1 is a side elevation of the preferred embodiment of the invention.
Figure 2:
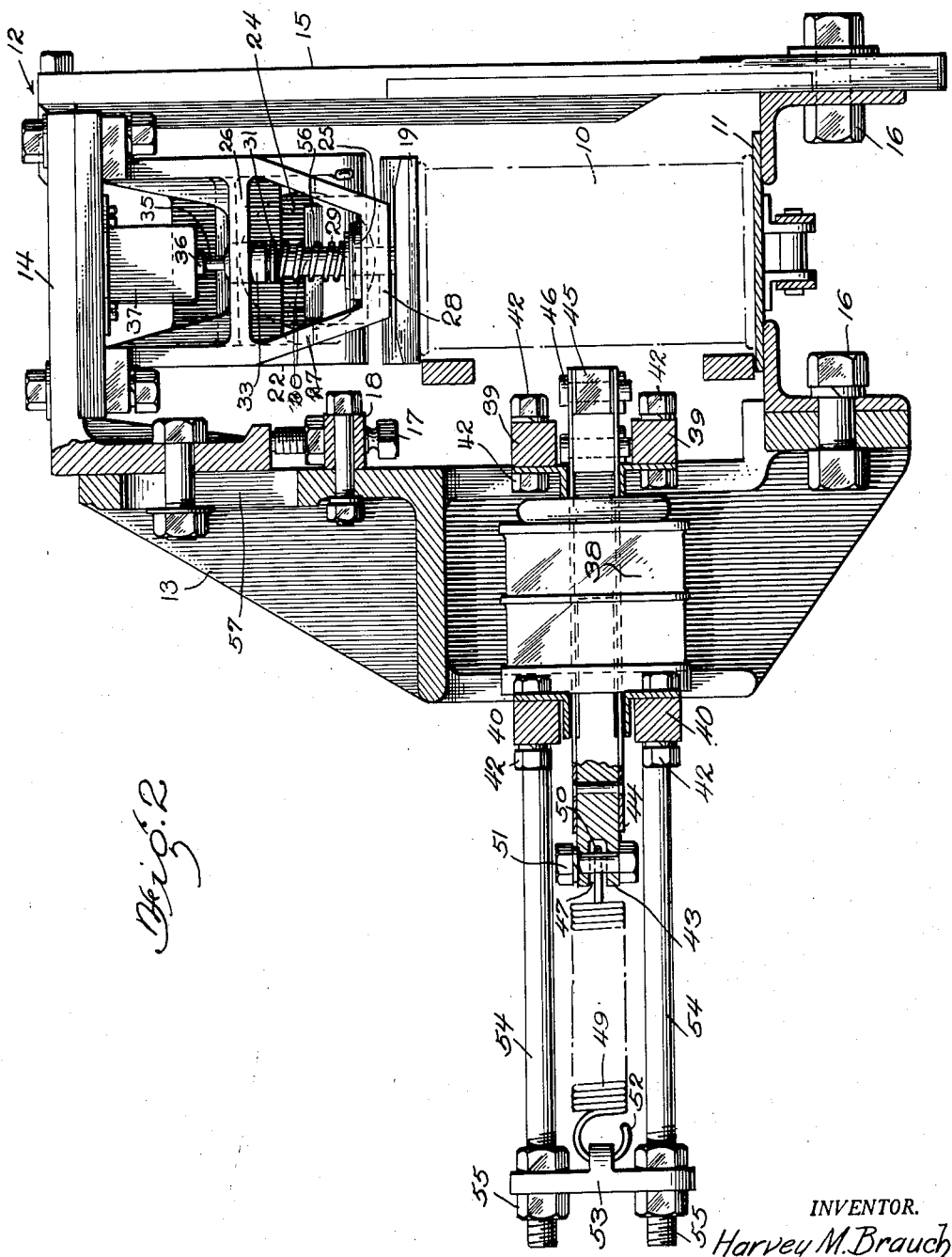
Fig. 2 is an end elevation; partly broken away.

In the mechanism shown, which is the preferred embodiment of the invention, cans 10 pass under the detector by way of an endless belt conveyor 11. Each can, as it passes on the conveyor, is tested by the detector and cans having their ends bulged thereby increasing their height are immediately ejected as being imperfect.

Detection of a can which is bulged closes an electrical circuit to a solenoid which discharges the imperfect can as it is being carried along by the conveyor. Discharging of the can is effected by a pusher which is attached to the solenoid plunger, which is located adjacent to the path of travel of the cans.

Referring now more in detail, it will be observed that the detector comprises a bridge frame 12 composed of parts 13, 14 and 15 which are bolted together and then secured to the bed or frame of the conveyor 11 by means of bolts and nuts 16.

A screw 17 which is adapted to rotate in support 18 attached to the frame 13 is used to align the bridge frame 12 with respect to the conveyor belt 11. After the bridge has been fastened to the conveyor belt and properly aligned by means of screw 17, the bridge will permit free passage of the perfect cans on the conveyor on its successive flights therethrough.

During the alignment, the bridge 12 is adjusted so that the shoe plate 19 will slide over a perfect can without any friction or displacement. The plate 19 is attached to a balance lever 20 which is pivoted on a pin 21 in a bracket 22 attached to the frame part 14. In order to properly oil the lever 20 and pin 21 a reservoir 56 is provided. The end 23 of the balance lever 20 carries a movable weight 24 which adjusts the balance of the lever 20. The other end 25 of the balance lever 20 would normally rest on the upper end 26 of the bracket 27, but it is kept in contact with the lower end 28 of the bracket 27 by means of a compression spring 29 which slides and works over a sleeve 30. The spring 29 bears against the head 31 of the sleeve 30. The inside of the sleeve 30 is threaded to suit the plunger 32.

The purpose of the threads within the sleeve and on the plunger is to provide adjustment for the spring tension to obtain a delicate balance. The plunger 32 has an enlarged head portion 33 which is attached to the plunger 32 by means of a pin 34. This entire assembly is adapted to reciprocate as a unit in the bracket 27. The reduced portion 35 of the head 33 is adapted to bear against a button 36 of a micro single throw snap switch 37 which normally is in open position. The brackets 22 and 27 are adjustable and can be adjusted to conform with the other parts of the tester. The spring 29 permits over travel of the balance lever 20 in case of an extremely high bulge in any can and also acts as a dashpot in returning the balance lever to the end 25 of the bracket 27. In order to more clearly understand the invention, it is to be understood that cans of like size are to be delivered successively and in properly spaced relation to each other through the bridge frame 12, directly under the shoe plate 19 of the balance lever 20. As long as the cans are perfect, this part of the tester already described will not function. Each can, on entering the tester is presumed to be perfect and the present test for the extent of bulge in the can takes into consideration that the can end walls will expand and the condition of a bad can is disclosed by such a bulge.

Associated with the balance lever 20 by means of an electrical circuit is a solenoid 38. The frame part 13 has a window or openings therein across which bars 39 and 40 are bolted by means of bolts 41 and the solenoid 38 is bolted to cross-bars 39 and 40 by means of bolts 42. The solenoid plunger 43 is secured to the ends of brass cover plates 44 and the other ends of plates 44 are secured to a pusher 45 by means of pins 46. The solenoid plunger 43 has an arcuate opening 47 in the end thereof and circular openings 48 in the top and bottom thereof. The tension spring 49 is adapted to have one end 50 thereof enter the arcuate opening 47 of the solenoid plunger 43. The end 50 of the tension spring 49 is retained in this arcuate opening by means of a bolt and nut 51 which is inserted through the circular openings 48 of the plunger 43. The end 52 of the tension spring 49 is adapted to enter an opening in a yoke 53 which is supported by rods 54 which are screwed into cross bars 40. Adjustment of the tension of the spring is provided by means of rotation of the nuts 55 on the ends of the bars 54. The spring, therefore, will place tension on the solenoid plunger 43 and will retract the plunger to its normal position when the circuit to the solenoid has been broken.

Should a can be bulged, causing the balance lever 20 to be moved upward, thus closing switch 37, the circuit will be closed and the solenoid 38 will be energized and plunger 43 will be forced outward, causing the pusher 45 to eject the can from the conveyor belt 11.

The testor is adjustable for both height and width, where the cans are concerned, in order that cans of different size may be conveyed for testing. The adjustment for height is accomplished by slots 57 in part 13 and slots 58 in part 15. The adjustment for width or diameter is accomplished by slots 59 in part 14.

It is thought that the machine has been thoroughly described as to structure and operation and it is not thought to be necessary to go into a more minute detailed discussion of the operation thereof.

Having thus described the invention, what is claimed as new and desired to secure by Letters Patent is:

1. In combination with a conveyor belt, an apparatus for separating imperfect cans from perfect cans comprising a bridge frame adapted to be positioned over said conveyor belt, means for ejecting an imperfect can from said conveyor belt and mechanism carried by said bridge frame adaped to co-act with the ends of said cans for actuating said ejecting means, said mechanism comprising a balance lever pivotally supported intermediate its length over the path of travel of the cans, means attached to said lever at one end for balancing it, and means for actuating said ejecting means and guiding and steadying the lever at its other end comprising a bracket depending from the bridge frame, a plunger slidably mounted in the bracket and yieldingly connected to the balance lever, said yielding connection maintaining the lever in balanced condition but permitting relative motion between the plunger and the lever when the plunger reaches its actuating position, said plunger contacting a portion of the ejecting means to actuate it when the balance lever is raised by the bulged end of an imperfect can.

2. In combination with a conveyor belt, an apparatus for separating imperfect cans from perfect cans comprising a bridge frame adapted to be positioned over said conveyor belt, means for ejecting an imperfect can from said belt, a switch for operating said ejecting means, detecting means carried by said bridge frame adapted to co-act with the end of said can, said detecting means comprising a balance lever pivotally supported intermediate its length over the path of travel of the cans, and means for guiding and balancing the lever at its contact end comprising a bracket depending from the bridge frame, a plunger slidably mounted in the bracket and yieldingly connected to the lever, the upper end of said plunger adapted to close said switch when said detecting means contacts with a can having bulged ends.

3. In combination with a continuously moving smooth surfaced conveyor belt on which a line of containers in abutting relation is adapted to be carried, a testing and ejecting station comprising a frame having a balance lever pivoted with one end at the level of the top of the normal containers, and an electromagnetically propelled ejector operating horizontally across the conveyor for pushing abnormally tall containers from the conveyor, and means for biasing both the lever and the ejector to positions compatible with the uninterrupted possage of normal containers, said lever when shifted from said position by a container having a bulged end setting the ejector in motion to eject the defective container so rapidly that the adjacent containers are not shifted on the belt.

4. In combination with a continuously moving smooth surfaced conveyor belt on which a line of containers in abutting relation is adapted to be carried, a testing and ejecting station comprising a frame having a balance lever pivoted with one end at the level of the tops of the normal containers, an electromagnetically propelled ejector operating horizontally across the conveyor for pushing abnormally tall containers from the conveyor, means for biasing both the lever and the ejector to positions compatible with the uninterrupted passage of the normal containers, said biasing means for the lever comprising a bracket depending from the frame and a plunger slidably mounted in the bracket and yieldingly connected to the balance lever, and a switch controlling the ejector adapted to be actuated by the upper end of the plunger, the yielding connection between the plunger and lever biasing the lever to its lower position but permitting relative motion between the plunger and the lever when the plunger reaches the position necessary to operate the switch.

HARVEY M. BRAUCHER.